Patented Feb. 26, 1952

2,586,814

UNITED STATES PATENT OFFICE 2,586,814

MOLD COMPOSITION FOR PRECISION CASTING AND METHOD OF FORMING MOLD

Herbert Greenewald, Jr., Haddonfield, N. J.

No Drawing. Application May 18, 1949, Serial No. 94,055

4 Claims. (Cl. 22—188)

This invention relates to foraminous molds, and particularly to molds and mold compositions capable of producing accurate or "precision" castings.

Heretofore many attempts have been made to produce foraminous molds which would result in metal castings having a good finish and close tolerances. All methods used to date have serious drawbacks which my invention does not have. The most common way of making such molds is the "lost wax" or "investment" method in which a destructible wax, plastic, or metal pattern is invested in a refractory slurry, the slurry allowed to set until it becomes hard, and the pattern melted or burned out leaving the finished mold. This process has a large economic disadvantage in that it is necessary to form a new pattern for each casting desired, while in my process a permanent pattern may be used.

Molds formed by methods common in the ceramic industry involving the use of clay bodies, high pressure, and high firing temperatures; molds formed by the ramming of sodium silicate-silica flour mixtures; and plaster of Paris molds; have heretofore been the best available methods for obtaining foraminous molds from a permanent pattern. Each of these methods has serious disadvantages which my process eliminates. The ceramic process requires heavy presses and high temperature kilns which my process does not. Furthermore the high firing temperature required in the ceramic process tends to distort the mold. The plaster of Paris molds are limited to non-ferrous metals while my molds are also adaptable to ferrous alloys. The sodium silicate-silica flour molds also have several disadvantages; such as, poor resistance to heat shock, the necessity for cooling the molds to approximately 400° F. before pouring metal into them, and low green strength.

It is an object of this invention to produce a cheap, destructible foraminous mold of superior surface and dimensional accuracy which is suitable for the reception of molten metals, both ferrous and non-ferrous.

Another object of this invention is to produce a foundry mold consisting mainly of silica flour and an inorganic binder.

Other objects of this invention will become apparent from the following description when taken in conjunction with the appended claims.

In practicing this invention, a mixture of silica flour (—200 mesh) and a swelling clay (such as bentonite), to which a predetermined amount of water is added, is utilized as a basic mold composition. This mold composition is then rammed into a flask containing a pattern, the pattern is removed, and the mold is baked at temperatures of 450° F. and above, during which baking the mold undergoes an irreversible reaction and becomes very hard and strong.

In general, the composition comprises a mixture of from 85% to 98% by weight of silica flour having a fine particle size and from 15% to 2% of a swelling clay (such as bentonite) by weight and from 10 to 20 parts by weight of water added to 100 parts of the dry mixture. The 10 parts of water is used with mixtures containing 2% clay and the 20 parts of water is used with mixtures containing 15% clay, intermediate clay contents requiring intermediate water additions. The water content of this molding material is much more critical than the clay content, in that a reduction of clay content (down to 2%) will not seriously affect the green or the baked strength of the molds, but a reduction of water content of a very few percent below the optimum for the clay content used will so reduce both the green and the baked strength of the mold as to render it worthless in most circumstances. It is most notable that the water content of the original mold composition has a very pronounced effect on the strength of the mold after all the water has been driven off by heat. Too much water also decreases green strength very seriously, makes the material sticky and hard to work, and causes the molds to crack during baking.

This molding material, within the composition ranges given above, is thoroughly mixed dry, the appropriate amount of water is added, and the resultant mixture is kneaded or mulled to form a homogeneous mass. This molding material is now ready for use and is fairly dry and quite light and fluffy. The molding compound is now rammed into a flask around a pattern to produce a green mold having excellent strength, surface, and accuracy of dimension. The ramming of the mold can be done by hand, by impact, or under pressure; it being noted that excellent results are obtained when pressure of approximately 1500 pounds per square inch is used. After ramming, the green mold has such strength that the pattern can be removed by a steady pull or by jarring without damaging the mold and without endangering the accuracy of the casting. Furthermore this green mold has such exceptional strength that it is feasible to withdraw a pattern having such bend or twist in it that it must follow a curved or a corkscrew path in its departure from the mold, and further that such a pattern can be withdrawn along such a path by a violent jarring action without deforming the mold. Patterns with twist or bend in them or with no draft; such as, gas turbine compressor blades and air foil blades; are commonly withdrawn from molds of this material.

After ramming and after pattern removal the flask is readily removed and the green mold is then placed in a suitable oven and subjected to a temperature in excess of 450° F. for a period of time that will allow the entire mold to come to that temperature or above. Of course the time required for the center of the mold to reach 450° F. will depend on the mold thickness and upon the oven temperature. It is necessary to bake the mold at this temperature or above in order to produce a final irreversible "set" in the molding material and thus render it hard enough to be handled with ease subsequently. Also after this baking the mold does not have any noticeable tendency to pick up moisture from the air even after prolonged exposure to humid atmospheres. If the mold is baked at temperatures below 450° F. it is much weaker, and it will pick up moisture from the air; and it will thus be much less desirable or even unsuitable for the reception of molten metal. During baking at temperatures below 450° F. the clay (bentonite) will give up moisture in a reversible reaction; i. e., after baking the clay the clay can be made to take up water again and will regain its plasticity; but during baking at 450° F. and above the reaction becomes irreversible and it becomes impossible to restore the plasticity of the mix by adding water. It is possible to dry the molds out as fast as the water can be evaporated from the mold surface to prevent the exudation of drops of water. Baking temperatures of up to 1500° F. have been used in order to speed up the drying and preheating process without ill effect. The molds may be withdrawn from the oven and used at any time after they have reached 450° F. throughout their cross-section. No care need be taken to prevent cracking from heat shock during cooling or heating of the mold as one of the new and unexpected properties of this material is its great resistance to heat shock. If it is desired to pour castings having very thin sections in this molding material it is commonly considered advisable to preheat the mold to form 1000° to 1900° F. (this temperature range should not be considered to be a limitation on the claims of this invention but merely an indication of usual practice) before pouring. The molding material is of such refractory nature that it is feasible to pour high melting alloys, such as steel, into these molds when preheated to 1500° F. and above. This refractoriness also precludes the need for mold washes which are sometimes used with other materials to prevent the metal from "burning in" to the mold. It should be noted here that if bentonite is used as a binder the fusibility of the mold increases with bentonite content and thus for work with high mold temperatures and high pouring temperatures it is considered advisable to limit the bentonite content to 5%.

In addition to its other advantages this molding material has the advantage of being at the one and the same time very strong and highly resistant to mishandling during preheating and pouring operations and yet sufficiently weak to crack under the stresses set up by the shrinking of the casting during cooling, thus preventing hot tears and deformation of the casting.

The strength of the molds being very high in both the green and the baked state, the mold walls can be quite thin; and thus no difficulty has been encountered due to low permeability on the part of the mold. Further, because of the fineness of the silica flour used and because of the high strength of the molds it is possible to obtain castings with a very smooth surface and fine detail within tolerances of a few thousandths of an inch.

Although this invention has been described with reference to a particular embodiment thereof, it is, of course, not to be limited thereto except as insofar as is necessitated by the scope of the appended claims.

I claim as my invention:

1. A mold composition consisting essentially of a mixture of 85% to 98% by weight of silica flour and 15% to 2% by weight of bentonite, the silica flour having a particle size predominantly finer than 200 mesh, and from 10 to 20 parts by weight of water added to 100 parts of the mixture, the water content being more important to the strength of the mold than the clay content.

2. A mold composition consisting essentially of, a mixture of 95% to 98% by weight of silica flour and 5% to 2% by weight of a swelling clay, the silica flour having a particle size predominantly finer than 200 mesh, and from 10 to 15 parts by weight of water added to 100 parts by weight of the mixture.

3. A method for causing an irreversible reaction to take place in a mold formed of a mixture of from 2 to 15 parts by weight of swelling clay, from 85 to 98 parts by weight of silica flour, and from 10 to 20 parts by weight of water by the heating of the mold to 450° F. and above, which irreversible reaction greatly increases the strength of the mold.

4. A mold composition consisting essentially of, a mixture of 95% by weight of silica flour, 85% through 200 mesh, and 5% by weight of a swelling clay, such as bentonite, with 15 parts by weight of water added to 100 parts of dry mixture.

HERBERT GREENEWALD, JR.

REFERENCES CITED

The following references are of record in the file of this patent:

UNITED STATES PATENTS

| Number | Name | Date |
| --- | --- | --- |
| 1,278,164 | Kerr | Sept. 10, 1918 |
| 1,657,573 | Hanley | Jan. 31, 1928 |
| 1,926,092 | Georgen | Sept. 12, 1933 |
| 1,935,362 | Kimber | Nov. 14, 1933 |
| 2,201,037 | Hagemeyer | May 14, 1940 |
| 2,256,456 | Dietert | Sept. 16, 1941 |
| 2,299,860 | Stoody | Oct. 27, 1942 |
| 2,322,667 | Seastone | June 22, 1943 |
| 2,399,606 | Schuh | Apr. 30, 1946 |
| 2,461,146 | Cress | Feb. 8, 1949 |